July 22, 1924.

C. S. MATTHEWS 1,501,960

PLOW OPERATING APPARATUS

Filed Aug. 9, 1923    3 Sheets-Sheet 2

FIG. 2.

INVENTOR.
C. S. Matthews,
BY
Geo. P. Kimmel. ATTORNEY.

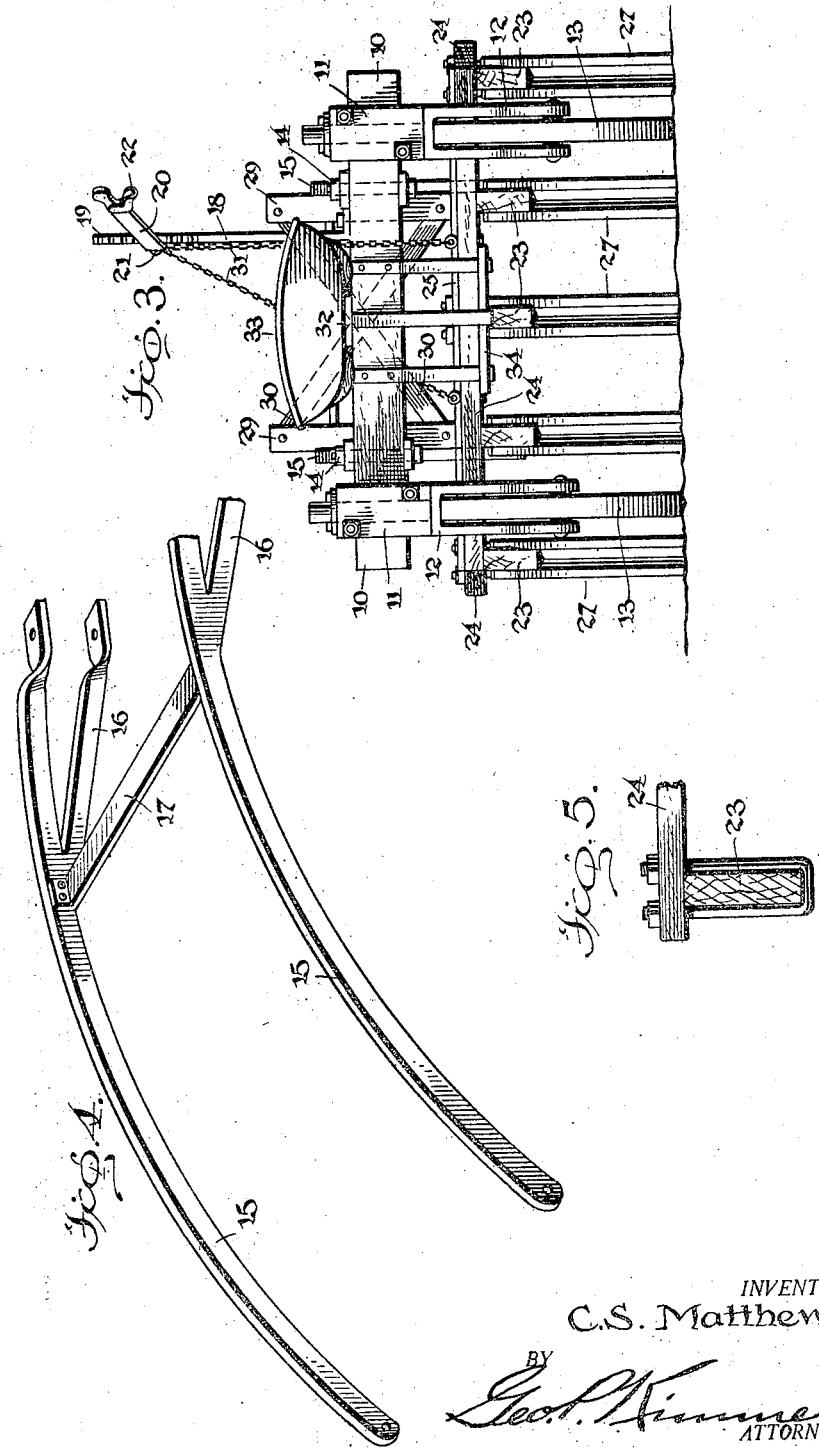

Patented July 22, 1924.

1,501,960

UNITED STATES PATENT OFFICE.

CHARLTON S. MATTHEWS, OF LITTLE MOUNTAIN, SOUTH CAROLINA.

PLOW-OPERATING APPARATUS.

Application filed August 9, 1923. Serial No. 656,617.

*To all whom it may concern:*

Be it known that I, CHARLTON S. MATTHEWS, a citizen of the United States, residing at Little Mountain, in the county of Newberry and State of South Carolina, have invented certain new and useful Improvements in Plow-Operating Apparatus, of which the following is a specification.

This invention relates to improvements in the means for operating plows and like implements, more particularly the class of gang plows, gang cultivators and the like, and has for one of its objects to improve the construction and increase efficiency and utility of devices of this character.

With these and other objects in view the invention consists in certain novel features of construction as hereinafter shown and described and then specifically pointed out in the claims, and in the drawings illustrative of the preferred embodiment of the invention.

Fig. 2 is a plan view, and

Fig. 3 is a rear elevation of the improved apparatus.

Fig. 4 is a detached perspective view of the suspension arms.

Fig. 5 is an enlarged transverse section on the line 5—5 of Fig. 2.

Figure 1:
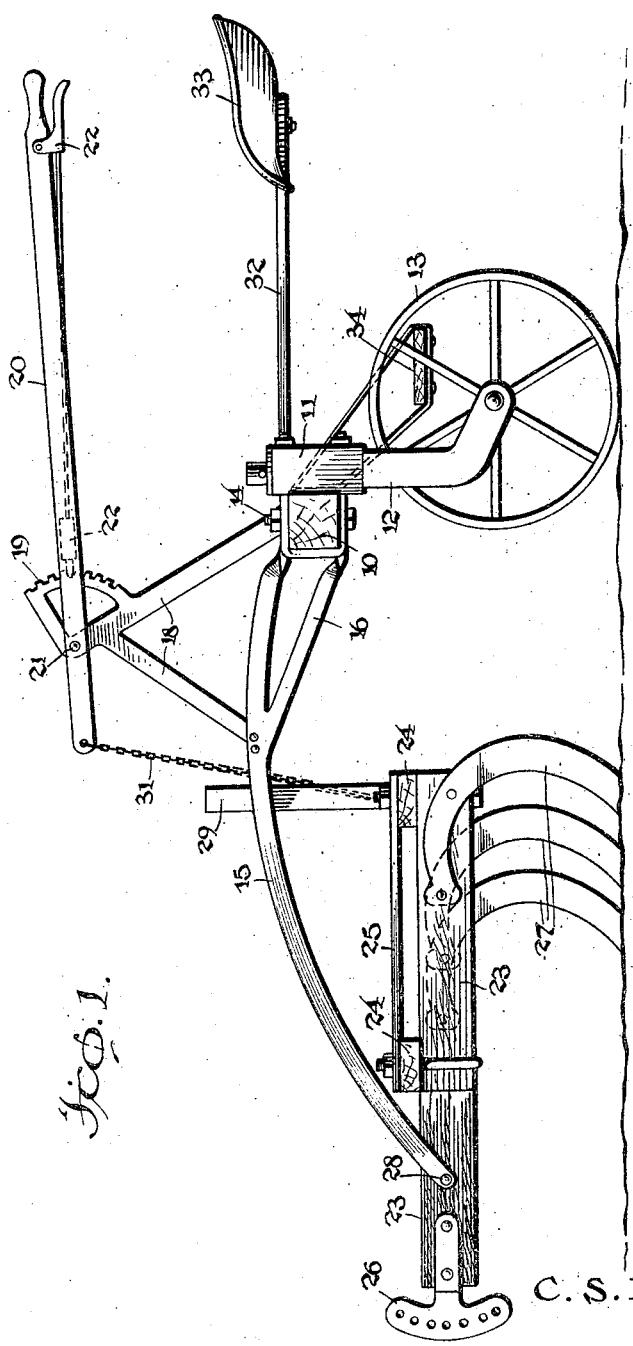
Fig. 1 is a side elevation.

The improved apparatus comprises a rear support including a main transverse beam 10 having a socket 11 near each end, the latter designed to swingingly support a yoke frame 12 carrying bearing wheels 13.

Attached at 14 to the beam 10 is a suspension frame including spaced side members extending forwardly of the beam, each side member comprising a main member 15 and brace 16. The main portions 15 are connected by a transverse brace or stay 17. Attached respectively to the beam member 10 and to the brace 17 is a standard 18 carrying a toothed segment 19. An operating lever 20 is pivoted at 21 to the standard 18 and is provided with a pawl device 22 coacting with the toothed segment 19 to hold the lever in adjusted position.

The plow portion of the improved apparatus comprises a frame formed with a plurality of longitudinally directed beams 23 spaced at uniform distances and coupled by transverse stay members 24 and supported by oblique braces 25. Two of the beam members 23 are extended forwardly and provided with clevis devices 26 to enable the plow frame to be coupled to a suitable traction element.

A plow element is coupled to each of the beams 23 and represented conventionally at 27. At their forward ends the side frame members 15 are pivoted to the plow frame, preferably to the extended beam members 23 as shown at 28.

Rising from rear stay member 24 are guide devices 29 against which the members 15 are movable when the plow frame is adjusted vertically.

The guide members 29 are supported by diagonally directed braces 30.

Pull chains 31 are connected respectively to the plow frame, for instance the rear stay member 24, and to the shorter end of the lever 20.

By this arrangement the plow frame may be elevated at the rear end and caused to swing upon the coupling pins 28, to control the depth of the action of the mold boards or shovels of the plows.

A seat standard 32 is attached to the beam member 10 and is provided with a seat 33, and the beam 10 is also provided with a suitable foot rest 34 convenient to the occupant of the seat.

The improved apparatus is simple in construction, can be inexpensively manufactured and adapted to plow or cultivator elements of various forms and construction, and enables the action of the plows to be readily controlled and guided.

The apparatus is particularly adapted to be drawn by a tractor, but may be drawn by draft animals, if preferred.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

1. An apparatus of the class described, comprising a rear support mounted for movement over the ground, a carrier frame including spaced side members extending forwardly of the support, a frame carrying plow elements and connected to swing at its forward end to the forward ends of said carrier frame side members, guide devices rising from said plow frame and slidably engaged by said carrier frame side members, and means attached to said plow frame for swinging the same on its pivotal connection to the carrier frame.

2. An apparatus of the class described, comprising a rear support mounted for movement over the ground, a carrier frame including spaced side members extending forwardly of the support, a frame carrying plow elements and consisting of spaced longitudinal beam members carrying plow elements and spaced transverse supports, certain of said beam elements being extended forwardly to receive draft appliances, and said forwardly extending beam elements pivotally united to the side members of the carrier frame, guide devices rising from said plow frame and slidably engaged by said carrier frame side members, and means attached to said plow frame for swinging the same on its pivotal connection to the carrier frame.

In testimony whereof, I affix my signature hereto.

CHARLTON S. MATTHEWS.